Aug. 27, 1929.  B. A. TETZLAFF  1,726,006
CLAMP
Filed Feb. 27, 1928

Inventor
Benjamin A. Tetzlaff
by Frank J. Schraeder Jr.
Attorney

Patented Aug. 27, 1929.

1,726,006

UNITED STATES PATENT OFFICE.

BENJAMIN A. TETZLAFF, OF BERWYN, ILLINOIS.

CLAMP.

Application filed February 27, 1928. Serial No. 257,121.

This invention relates generally to certain new and useful improvements in clamps adapted for use in connection with tubular or cylindrical bodies, and more particularly adapted for securing together two of such bodies, as for example, securing a hose to a pipe. The invention is also adaptable for use as a ground connection clamp for electric circuits, such as radio and the like.

An important object of the invention is to provide a fastening device or clamp which comprises a band formed of a single piece of metal strip in a manner to produce a complete clamp, requiring only a bolt and nut for tightening purposes.

More specifically, it is an object of my invention to provide a clamp comprising a unit band having integral connections formed thereon which may be drawn together to tighten the band by means of a single bolt.

Another object of my invention resides in the provision of a clamp formed of a single metallic band with integral connections formed thereon by punch and die operations and such integral connections being formed within the outer edges of the band or strip of material to leave marginal surfaces along the sides of the band or strip so that it may be run without interruption through a machine which is adapted to perform successive punching, die forming and rolling operations; the rolls of the machine being recessed or grooved to permit such connections to pass through the recesses while the rolls engage the marginal surfaces during the rolling operation of the clamps. Thus these clamp bands may be made complete in a continuous series of operations on one machine without rehandling to lower their production cost.

With the above and other objects in view, my invention consists in the combination, construction and arrangement of the parts forming the body of the clamp shown in preferred embodiments in the attached drawings, described in the following specifications and particularly pointed out in the appended claims.

Figure 1:
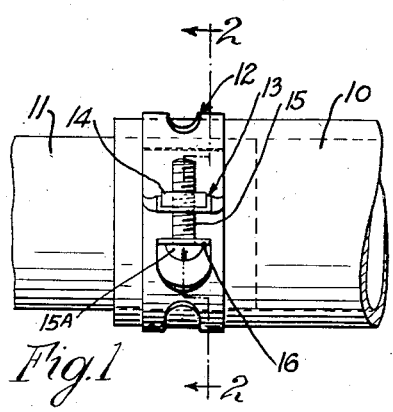
Figure 2:
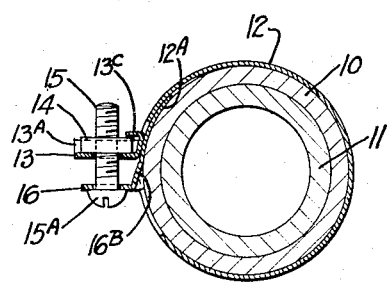
Figure 4:
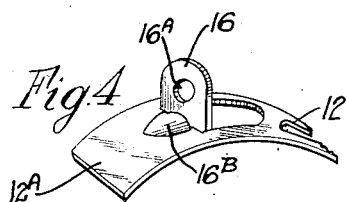
Figure 3:
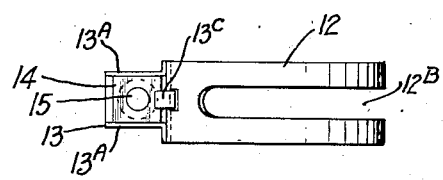
Figures 5, 5A:
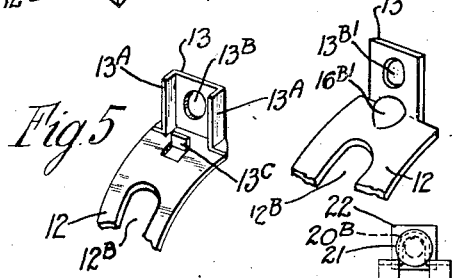
Figure 7:
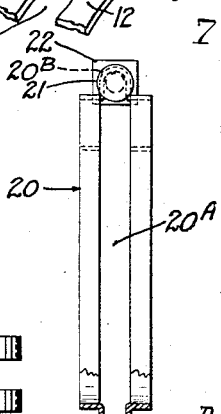
Figure 6:
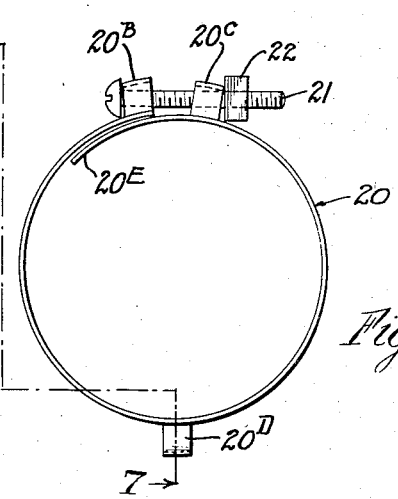
Figure 8:
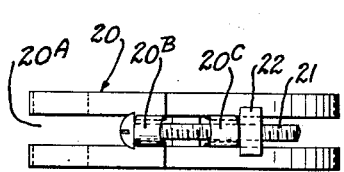
Figure 9:
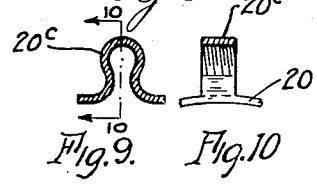
Figure 10:
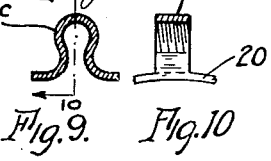

In the drawings: Fig. 1, shows a side elevation of a clamp embodying my invention as applied to securing together a pair of cylindrical members. Fig. 2, is a cross-section taken on line 2—2 of Fig. 1. Fig. 3, is a side view looking down on the clamp shown in Fig. 2. Fig. 4, is a perspective view of a portion of one end of the clamp band showing one of the connections. Fig. 5, is a perspective view of a portion of the other end of the clamp band showing the other connection. Fig. 5$^A$, is a modification of Fig. 5. Fig. 6, is an end view of a modification of my invention. Fig. 7, is a side view and partial section taken on line 7—7 of Fig. 6. Fig. 8, is a plan view of the clamp shown in Fig. 6. Fig. 9, is a cross-section of a modified connection $20^C$, and Fig. 10, is a cross-section on line 10—10 of Fig. 9.

Referring now in more detail to the clamp shown in Figs. 1 to 5 inclusive, 10 indicates, for example, a hose embracing the end of a pipe or other hose 11. The band 12 is formed with a connection 13 at one end thereof which is adapted to confine a nut 14 for the tightening bolt 15.

The connection 13, as will be clearly observed from Fig. 5, is formed integrally with the band 12 and at one end thereof by bending portions of sides of the band right-angularly to the body thereof to form sides $13^A$ and then bending the end of the band with the sides $13^A$ angularly to the band body to form the upstanding connection 13. It may here be stated that an opening $13^B$ for the bolt 15 is punched out in the end of the band 12 before the connection 13 is formed. As a further means of retainment for the nut 14 an upstanding lug $13^C$ may be punched up as shown in Figs. 5 and 6.

Near the other end of the band 12, I form the other connection 16 which is provided with an opening $16^A$ for the tightening member 15 and which connection 16 is formed by punching and bending upwardly as shown in the drawings.

Preferably, a drawn boss $16^B$ may be formed, as shown in Figs. 2 and 4, at the base of the upstanding connection 16 which will strengthen same and resist bending of the connection upon tightening of the bolt 15, the head $15^A$ of which engages upon the connection 16 on the opposite side at which the boss $16^B$ is formed.

It will now be readily apparent, that when the clamp 12 is mounted, as shown in Figs. 1 and 2, over the members 10 and 11, that the connection 13 will extend over the end $12^A$ of the band 12 and that the clamp may readily be tightened thereon by drawing the connections 13 and 16 together by the tightening bolt 15 and cooperating nut 14.

In the modification of my invention, shown in Figs. 6, 7 and 8, the flexible band 20 is first punched out to provide slots 20^A which extend throughout the length of the band 20 except where the connections 20^B and 20^C and spacer 20^D occur.

After this punching or slotting operation is performed, the two band-like portions are drawn together to form the outstanding connections 20^B and 20^C and the spacer 20^D.

The portions 20^B, 20^C, and 20^D are here shown as integral sections of U-shaped cross-section. The connection 20^B is formed at one end of the band 20, while the connection 20^C is formed near the other end of the band 20 to afford tongue-like extensions 20^E which are overlapped by the other end of the band with the connection 20^B.

A screw or bolt 21 and nut 22 are provided as a tightening means for drawing the connections 20^B and 20^C together to tighten the band.

It is obvious that the spacer or separator portion 20^D may be dispensed with, but I prefer to use same as a spacer or separator to retain the spaced portions of the band in spaced alignment.

In the clamp shown in Figs. 1 to 5 inclusive, it must be noted that the connections 13 and 16 and the portions 20^B, 20^C and 20^D of the clamp shown in Figs. 6, 7 and 8, are all narrower than the width of the band or material, that is, they are all formed within the outer or side edges of the band so as to leave a marginal edge at their sides to permit the passage of the band or strip of material through a machine without interruption, whereby the strip of material may be successively punched, die formed and rolled to circular formation as a complete clamp, requiring only the introduction of the tightening screw or bolt. The rolls in the machine performing the final operation of rolling the clamp, are formed with a central groove or recess to permit the passage therebetween of the connections 13 and 16 or the portions 20^B, 20^C and 20^D while the edges of the rolls along the recesses engage along marginal surfaces of the band of material.

The modification shown in Fig. 5^A shows the connection 13^1 narrower than the width of the band 12 provided with hole 13^B1 and bent upwardly as a possible substitute for the connection 13 shown in Fig. 5. A boss 16^B1 may also be provided to stiffen the upstanding connection 13^1. Furthermore, the connection 13^1 may be stamped out of the end 12^A of the next clamp band and thus save additional material.

It is also to be noted that the connection 20^C may be threaded (as shown in Figs. 9 and 10) to receive the screw 21, thus the nut 22 may be dispensed with.

Also the strap 12 may be provided with a plurality of elongated slots 12^B as shown in Figs. 1 to 5 inclusive.

The slotting of the strap or band 12 will not only save material which may be salvaged, but will afford a more efficient clamp as the same may be easily tightened having less resistance to overcome in the surface of the hose member 10.

I claim:—

1. A clamp of the kind described comprising a single band or strip of material having a pair of connections, and means for drawing said connections together to tighten the clamp, said connections being narrower than the width of said band or strip of material to permit their passage between rolls for rolling operation of the clamp while said rolls engage the marginal edges of the material as it passes between them.

2. A clamp of the kind described comprising a single band or strip of material having a pair of connections formed integrally with said material, and means for drawing said connections together to tighten the clamp, said connections being narrower than the width of said band or strip of material to permit their passage between rolls for rolling operation of the clamp while said rolls engage the marginal edges of the material as it passes between them.

3. A clamp comprising a single band of flexible material having a pair of connections formed integrally with said band of material, one of said connections being formed at one end of said band of material and the other of said connections being formed near the other end of said band of material to permit the insertion of said other end of said band of material beneath said first named end, both of said connections having an opening therein, and a bolt or screw adapted to pass through said openings and adapted to draw said connections together to tighten the clamp, both of said connections being narrower than the width of said band of material.

4. A clamp comprising a single band of material having a pair of connections formed integrally with said band of material, one of said connections being formed at one end of said material and comprising an angularly bent portion having the side edges thereof bent right-angularly toward the adjacent band of material to form stiffening sides for said connections and retaining means for a nut, the other of said connections being formed near the other end of said band of material to permit the insertion of a portion of said other end beneath said first named connection, both of said connections having an opening therein, a nut positioned adjacent said first named connection between said right-angularly bent edges, and a screw or bolt adapted to pass through said openings in said connection into engagement with said nut for tightening the clamp.

5. A clamp as embodied in claim 4, and including said other connection comprising upstanding integral portion of said band of material and a stiffening boss at the lower end thereof drawn upwardly from the body of said band of material to brace said other connection against the pull of said tightening screw or bolt.

6. A clamp as embodied in claim 5, wherein both of said connections are formed narrower than the width of said band of material for the purpose set forth in the specification.

7. A clamp comprising a band of material having a slot extending longitudinally throughout the entire length thereof, a pair of connections formed integrally with said band of material, said connections being substantially of U-shaped cross-section, and tightening means adapted for positioning within the sides of said U-shaped connections adapted for drawing said connections together to tighten the clamp.

8. A clamp as embodied in claim 7, including a member of U-shaped cross-section formed integrally with said band of material and substantially intermediate the ends thereof.

9. A clamp as embodied in claim 2, and including said band or strip of material having a longitudinal slot therein extending between said connections.

10. A clamp as embodied in claim 3, and including said band or strip of material having a longitudinal slot therein extending between said connections.

11. A clamp as embodied in claim 4, and including said band or strip of material having a longitudinal slot therein extending between said connections.

In witness whereof I affix my signature.

BENJAMIN A. TETZLAFF.